United States Patent
Jaudouin

(10) Patent No.: US 7,000,880 B2
(45) Date of Patent: Feb. 21, 2006

(54) SLIDE FOR MOTOR VEHICLE SEAT

(75) Inventor: Paul Jaudouin, Saint-Georges des Groseilliers (FR)

(73) Assignee: Faurecia Sieges d'Automobile S.A., Nanterre (FR)

(*) Notice: Subject to any disclaimer, the term of this patent is extended or adjusted under 35 U.S.C. 154(b) by 27 days.

(21) Appl. No.: 10/804,690

(22) Filed: Mar. 19, 2004

(65) Prior Publication Data

US 2004/0188586 A1    Sep. 30, 2004

(30) Foreign Application Priority Data

Mar. 24, 2003    (FR) ................................. 03 03543

(51) Int. Cl.
*F16M 13/00*    (2006.01)
*G05G 5/06*     (2006.01)

(52) U.S. Cl. .................... 248/429; 74/527; 297/344.11

(58) Field of Classification Search ................ 248/429, 248/419, 423, 424; 180/227; 74/527; 297/344.11, 297/216.1, 216.15, 216.18
See application file for complete search history.

(56) References Cited

U.S. PATENT DOCUMENTS

| | | | | |
|---|---|---|---|---|
| 4,204,658 A | * | 5/1980 | Courtois | 248/430 |
| 4,804,229 A | * | 2/1989 | Nishino | 297/471 |
| 5,234,189 A | * | 8/1993 | Myers | 248/429 |
| 5,560,262 A | | 10/1996 | Orzech | 74/527 |
| 5,772,173 A | * | 6/1998 | Couasnon | 248/430 |
| 5,782,138 A | | 7/1998 | Groche | 74/527 |
| 5,816,110 A | | 10/1998 | Schuler et al. | 74/527 |
| 6,036,157 A | * | 3/2000 | Baroin et al. | 248/429 |
| 6,113,051 A | * | 9/2000 | Moradell et al. | 248/430 |
| 6,322,036 B1 | | 11/2001 | Tame et al. | 248/429 |
| 6,641,104 B1 | | 11/2003 | Flick | 248/430 |
| 6,772,985 B1 | * | 8/2004 | Lee | 248/424 |
| 6,843,532 B1 | * | 1/2005 | Borbe et al. | 297/344.11 |
| 6,892,995 B1 | * | 5/2005 | Tame et al. | 248/429 |
| 2002/0190182 A1 | | 12/2002 | Flick et al. | 248/430 |

FOREIGN PATENT DOCUMENTS

| | | | |
|---|---|---|---|
| DE | 44 37 293 | 12/1994 | ........................ 2/6 |
| DE | 44 03 310 | 8/1995 | ........................ 2/8 |
| DE | 44 23 971 | 1/1996 | ........................ 2/8 |
| DE | 100 50 957 A 1 | 5/2002 | |
| DE | 102 06 300 A 1 | 8/2003 | |
| DE | 203 11 948 U 1 | 11/2003 | |
| GB | 2 320 183 | 6/1998 | ........................ 2/6 |

OTHER PUBLICATIONS

Preliminary Int'l. Search Report dated Dec. 3, 2003; Appl. No. FR 0303543.

* cited by examiner

*Primary Examiner*—Anita M. King
(74) *Attorney, Agent, or Firm*—McCracken & Frank LLP

(57) ABSTRACT

Slide for vehicle seat, comprising a first runner provided with first and second notches, a second runner provided with first and second cut-outs and a catch comprising first and second teeth. The first and second cut-outs are disposed asymmetrically relative to the longitudinal direction so that, when the catch is in the locked position, firstly the first tooth can be in contact with the inclined front edge of the first cut-out and with the rear edge of the first notch and secondly the second tooth can be in contact with the inclined rear edge of the second cut-out and with the front edge of the second notch.

11 Claims, 6 Drawing Sheets

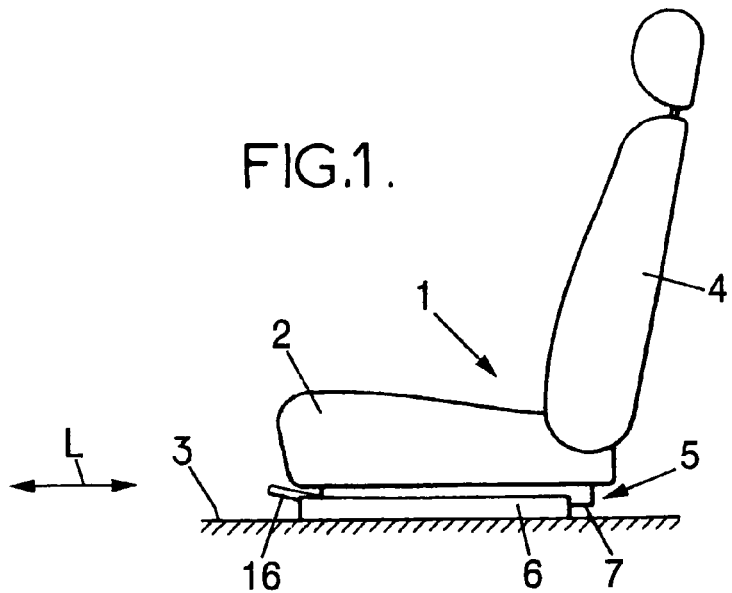
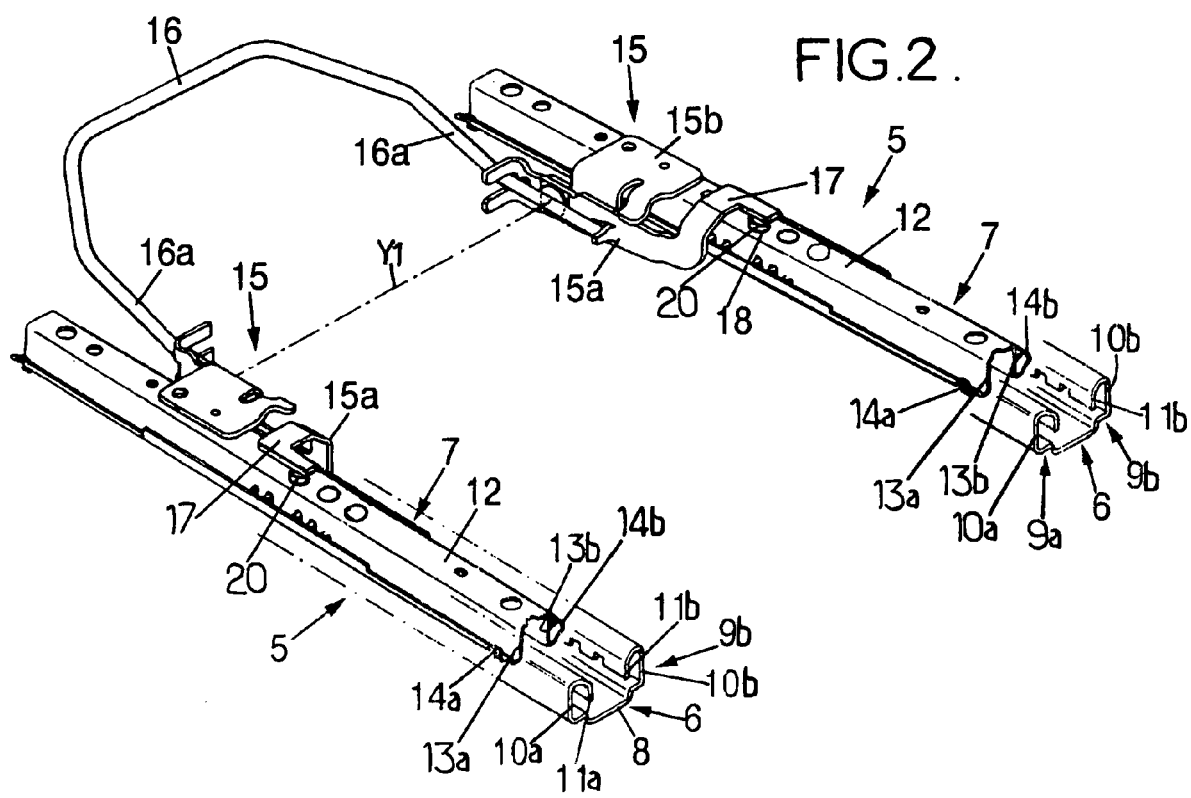

SLIDE FOR MOTOR VEHICLE SEAT

FIELD OF THE INVENTION

The present invention relates to slides for motor vehicle seats. These slides are intended to support the seats so that they can slide in a longitudinal direction in order to allow them to be adjusted forwards and rearwards. The slides are usually grouped into sets of two parallel slides for each seat.

BACKGROUND OF THE INVENTION

More particularly, the invention concerns, among such slides, those that comprise first and second runners and locking means to prevent or allow a relative longitudinal movement of the first and second runners, and in which:
  the first runner comprises at least first and second notches, each notch being delimited longitudinally by a front edge and a rear edge,
  the second runner comprises at least first and second cut-outs, each cut-out being delimited longitudinally by a front edge and a rear edge,
  the locking means comprise a catch mounted on the second runner and having at least first and second teeth, the catch being able to be moved in a direction perpendicular to the longitudinal direction between a locked position in which the first and second teeth pass through the first and second cut-outs respectively to engage in the first and second notches to immobilize the first and second runners relative to one another, and an unlocked position in which the first and second teeth do not interact with the first and second notches of the first runner to allow the relative movement of the first and second runners.

In this type of known slide, when the catch is in the locked position, the first and second teeth of the catch pass, with a degree of longitudinal clearance, through the cut-outs of the second runner to engage, also with longitudinal clearance, in the notches of the first runner.

Thus, even when the catch is in the locked position, the first and second runners undergo relative movements of a few millimetres or of a few tenths of millimetres, which is likely to cause inconvenience of use for the user when the latter is sitting on the vehicle seat.

OBJECTS AND SUMMARY OF THE INVENTION

The object of the present invention is in particular to mitigate the abovementioned disadvantages.

As a result, according to the invention, in a slide of the kind in question, the front edge of at least one of the first cut-out and notch is inclined rearwards and the rear edge of at least one of the second cut-out and notch is inclined forwards and the catch is suitable for allowing, when it is in the locked position, firstly the first tooth to be solely in contact with the front edge of the first cut-out and with the rear edge of the first notch and secondly, the second tooth to be solely in contact with the rear edge of the second cut-out and with the front edge of the second notch.

Due to these dispositions, when the catch is in the locked position, its first tooth has a front edge solely in contact with the first runner and a rear edge solely in contact with the second runner, whereas the second tooth comprises a front edge solely in contact with the second runner and a rear edge solely in contact with the first runner. Thus, the first and second teeth of the catch are held scissor-fashion between the first and second runners thereby taking up the longitudinal clearance of the slide and minimizing the regions of contact of the teeth with the first and second runners which also makes it possible to minimize the friction between the runners and the catch when the latter moves.

In preferred embodiments of the invention, use may be made of one and/or the other of the following dispositions:
  the front edge of the first cut-out is inclined rearwards and the rear edge of the second cut-out is inclined forwards, the said first and second cut-outs being disposed asymmetrically relative to the longitudinal direction;
  the first and second teeth are disposed asymmetrically relative to the longitudinal direction;
  the first and second teeth are disposed symmetrically relative to the longitudinal direction, and the first and second notches are disposed asymmetrically relative to the longitudinal direction;
  each notch and each cut-out has a base from which the front and rear edges extend, and each tooth has a width which, in the longitudinal direction, is less than the width of the coverage region of the bases of a notch and of the corresponding cut-out when the catch is in the locked position;
  the catch comprises a first series of teeth comprising in particular the first tooth and a second series of teeth comprising in particular the second tooth, the second runner comprises a first series of cut-outs comprising in particular the first cut-out intended to interact with the first tooth and a second series of cut-outs comprising in particular the second cut-out intended to interact with the second tooth, and the first runner comprises a first row of notches comprising in particular the first notch and a second row of notches comprising in particular the second notch;
  only the first and second cut-outs of the first and second series of cut-outs are disposed asymmetrically relative to the longitudinal direction;
  all the cut-outs of the first and second series of cut-outs are disposed asymmetrically relative to the longitudinal direction;
  the front edge of the first notch is inclined rearwards and the rear edge of the second notch is inclined forwards, the said first and second notches being disposed asymmetrically relative to the longitudinal direction, and the first and second teeth are also disposed asymmetrically relative to the longitudinal direction;
  the second runner comprises guidance means for guiding the catch in the direction perpendicular to the longitudinal direction, and elastic return means for elastically returning the catch from the unlocked position to the locked position; and
  the catch is attached at a bottom end of a control rod mounted so as to slide and pivot in the said guidance means of the second runner.

Other features and advantages of the description will appear in the course of the following description of several of its embodiments given as non-limiting examples, with respect to the attached drawings.

BRIEF DESCRIPTION OF THE DRAWINGS

In the drawings:

FIG. 1 is a view in side elevation of a seat provided with slide according to the invention;

FIG. 2 is a view in perspective of slides suitable for equipping the seat in FIG. 1, the first runner of each slide being only partially shown;

MORE DETAILED DESCRIPTION

Figure 3:
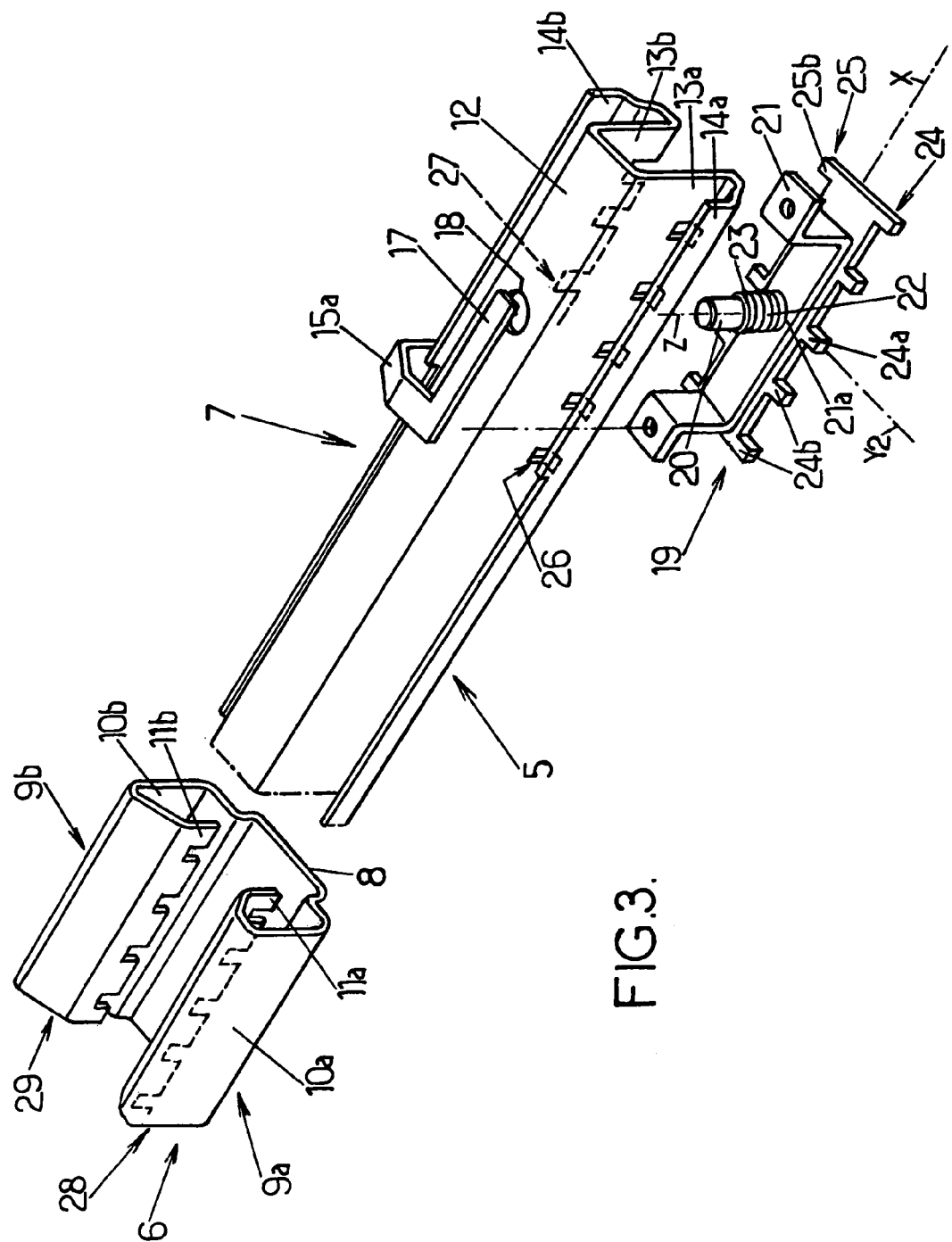
FIG. 3 is a view in perspective of the locking mechanism of one of the slides in FIG. 2 according to a first embodiment of the invention.

In the various figures, the same reference numbers designate identical or similar elements.

FIG. 1 shows a seat 1 of a motor vehicle which has a seat cushion 2 mounted on a vehicle floor 3 and a seat back 4 mounted on the seat cushion 2.

The connection between the floor 3 of the vehicle and the seat cushion 2 of the seat is made by means of two slides 5 (only one of which is visible in FIG. 1) for adjusting the position of the seat 1 on the floor 3 of the vehicle by sliding in a longitudinal direction L.

Each of the two slides 5 shown in FIG. 2 comprises a first runner or fixed runner 6 directly fixed to the floor 3 of the vehicle, and a second runner or mobile runner 7 mounted in sliding fashion inside the fixed runner 6. This mobile runner 7 is intended to be fixed by any appropriate means onto the lower face of the seat cushion 2.

As can be seen in greater detail in FIGS. 2 and 3, in the example considered here, the fixed runner 6 has a straight transverse section of generally U-shape which comprises a lower horizontal web 8 from which extend two lateral walls 9a, 9b each formed of a substantially vertical flange 10a, 10b, which are extended by a flange return 11a, 11b. Each flange return 11a, 11b of the lateral walls 9a, 9b of the fixed runner 6 faces towards the inside of the U and is directed towards the web 8 of the fixed runner 6.

The mobile runner 7, has, for its part, a straight transverse section which is also generally U-shaped and which comprises an upper horizontal web 12 from which two vertical flanges 13a, 13b extend downwards. These two vertical flanges 13a, 13b of the mobile runner 7 are extended respectively by flaps 14a, 14b oriented upwards and towards the outside of the U.

When the mobile runner 7 is assembled with the fixed runner 6 to form the slide 5, the flaps 14a, 14b of the mobile runner 7 are housed respectively between the vertical flanges 10a, 10b and the flange returns 11a, 11b of the fixed runner 6. Conversely, the flange returns 11a, 11b of the fixed runner 6 are housed respectively between the vertical flanges 13a, 13b and the flaps 14a, 14b of the mobile runner 7.

The lateral walls 9a, 9b of the fixed runner 6 and the flaps 14a, 14b of the mobile runner 7 delimit housings conformed in such a way as to form rolling bearing raceways for balls (not shown in the figures) in order to facilitate the longitudinal movement of the mobile runner 7 in the fixed runner 6.

As can be seen in FIG. 2, each slide 5 also comprises means 15 of locking and unlocking the mobile runner 7 relative to the fixed runner 6. These locking and unlocking means 15 are controlled by a control member 16 such as a cross-bar or the like, being in the form of a bow of which the two lateral branches 16a are connected respectively to the locking and unlocking means 15 of the two slides 5. The control member or cross-bar member 16 also comprises a central branch located substantially beneath the front end of the squab 2 so that it can be actuated by a user of the seat 1.

These locking and unlocking means 15, as can be seen in FIG. 2, each comprise a support 15b attached to the mobile runner 7 which is connected to it for example by riveting or by welding, and also a lever 15a mounted so as to pivot on the support 15b about a transverse axis Y1. The two lateral branches 16a of the cross-bar 16 are connected to the two levers 15a so as to allow them to pivot by actuation of the central branch of the cross-bar 16.

Each lever 15a of the locking and unlocking means 15 has a control finger 17 which is intended, when the lever 15a pivots about the transverse axis Y1, in order to move a catch 19 to lock or unlock the mobile runner 7 relative to the fixed runner 6.

In the example illustrated in FIG. 3, the catch 19 is formed of a steel plate secured at the bottom end of a control rod 20 which also has a top end intended to pass through an opening 18 made in the flat upper web 12 of each mobile runner 7 to interact with the control finger 17 which is associated with it. This control rod 20 is mounted in sliding fashion with clearance in the vertical direction Z within a through-opening 21a of a metal guide 21 in turn fixedly attached to the flat web 12 of the mobile runner 7.

The control rod 20 is also mounted so as to pivot relative to the metal guide 21 and about a vertical axis Z and the catch 19 is suitable for pivoting slightly about a longitudinal axis X and about a transverse axis Y2 which are both perpendicular to the vertical axis Z.

This guide 21 supports elastic return means 22 such as a helical spring surrounding the control rod 20 and pushing the catch 19 towards a locked position in which the catch 19 is close to the guide 21. As a result, the spring 22 can be interposed between the metal guide 21 and a collar 23 made on the control rod 20.

The catch 19 extends substantially horizontally and parallel to the webs 8 and 12 of the fixed runner 6 and mobile runner 7.

This catch 19 comprises on a first lateral edge a first series of teeth 24 and on its other lateral edge a second series of teeth 25.

The first and second series of teeth 24, 25 extend transversely beyond the flanges 13a, 13b of the mobile runner 7, thereby passing respectively through the first and second series of cut-outs 26, 27 made in the lower parts of the two vertical flanges 13a, 13b of the mobile runner 7. Furthermore, the first and second series of teeth 24, 25 of the catch 19, when they pass through the first and second series of cut-outs 26, 27, engage respectively in the first and second rows of notches 28, 29 made respectively on the ends of the flange returns 11a, 11b of the fixed runner 6. Thus, when a user actuates the cross-bar 16, the control finger 17 of each lever 15a presses on the upper end of the control rod 20 in order to move the catch 19 vertically into its unlocked position corresponding to a down position in which the first and second series of teeth 24, 25 do not interact with the first and second rows of notches 28, 29 of the fixed runner 6. In this unlocked position of the catch 19, the mobile runner 7 can thus be moved longitudinally relative to the fixed runner 6.

When the user releases the cross-bar 16, the spring 22 of each of the locking and unlocking means 15 then automatically returns the catch 19 associated with it to its locked position corresponding to an up position in which the first and second series of teeth 24, 25 engage in the first and second rows of notches 28, 29 while passing through the first and second series of cut-outs 26, 27 of the mobile runner 7.

Figure 4:
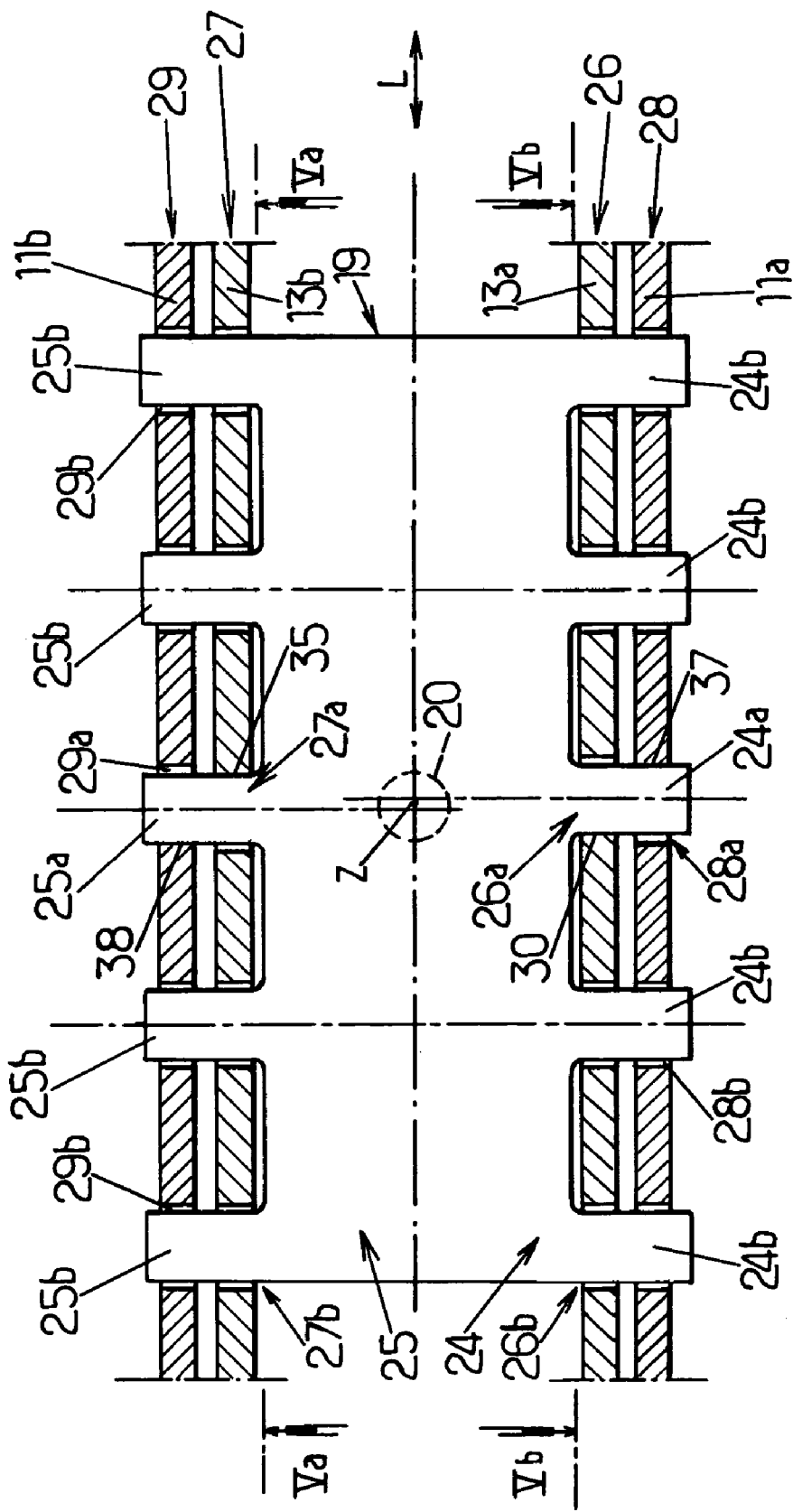
FIG. 4 is a schematic view in partial section of a first form of embodiment of the first and second runners of the slide and also of the catch.

As can be seen in FIGS. 3 and 4, each of the first and second series of teeth 24, 25 comprises five teeth and the first and second series of cut-outs 26, 27 of the mobile runner 7 also each comprise five cut-outs intended to interact respectively with the first and second series of teeth 24, 25. The first and second rows of notches 28, 29 comprise for their part a plurality of notches which extend longitudinally along the whole length of the flange returns 11a, 11b of the fixed runner 6.

As can be seen in greater detail in FIG. 4, the first series of teeth 24 of the catch 19 comprises one central tooth 24a, hereinafter called the first tooth 24a, and four end teeth 24b disposed on each side of the first tooth 24a. Likewise, the second series of teeth 25 comprises one central tooth 25a, hereinafter called the second tooth 25a, and four teeth 25b disposed on each side of the second tooth 25a.

The first series of cut-outs 26 of the mobile runner 7 formed of five cut-outs also comprises one central cut-out 26a, hereinafter called the first cut-out 26a, intended to interact with the first tooth 24a, and cut-outs 26b disposed on each side of the first cut-out 26a and intended to interact with the teeth 24b of the first series of teeth 24.

Likewise, the second series of cut-outs 27 also formed of five cut-outs, comprises one central cut-out 27a, hereinafter called the second cut-out 27a, intended to interact with the second tooth 25a, and end cut-outs 27b intended to interact with the end teeth 25b of the second series of teeth 25 of the catch 19.

The first row of notches 28 comprises for its part at least one notch 28a, hereinafter called the first notch 28a, intended to interact with the first tooth 24a of the bolt, and notches 28b disposed on each side of the first notch 28a and intended to interact with the teeth 24b of the catch 19. Likewise, the second row of notches 29 comprises one notch 29a, hereinafter called the second notch 29a, intended to interact with the second tooth 25a of the catch 19 and notches 29b disposed on each side of the second notch 29a and intended to interact with the teeth 25b of the catch 19.

The first row of notches 28, like the second row of notches 29, can be formed of groups of five notches, that is the first notch 24a and the four notches 24b, disposed at regular or irregular intervals to form predetermined regions of anchorage of the mobile runner 7 relative to the fixed runner 6.

Figure 5A:
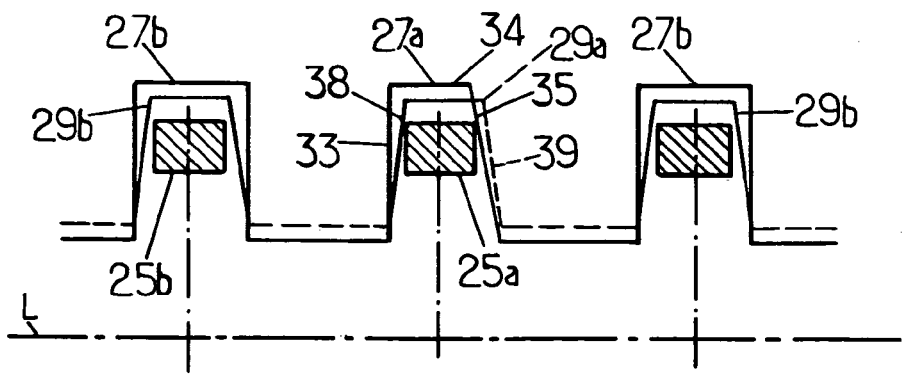
FIGS. 5a and 5b are views in section respectively along the lines Va—Va and Vb—Vb in FIG. 4.
Figure 5B:
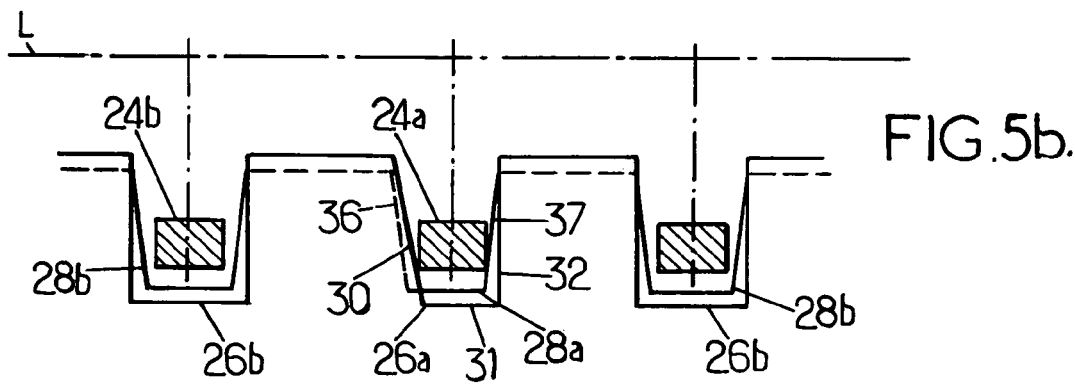

According to a first form of embodiment of the invention shown in FIGS. 4, 5a and 5b, the first tooth 24a and the second tooth 25a of the catch 19 are disposed substantially opposite one another but asymmetrically relative to the longitudinal direction L. As can be seen in FIG. 4, the first and second teeth 24a and 25a are to a greater or lesser degree aligned with the lower end of the control rod 20. Conversely, the other teeth 24b of the first series of teeth 24 and the teeth 25b of the second series of teeth 25 are disposed opposite one another and symmetrically relative to the longitudinal direction L.

As an example, the first tooth 24a may be slightly offset rearwards, that is towards the right portion of FIG. 4, whereas the second tooth 25a is slightly offset forwards, that is towards the left portion of FIG. 4.

FIGS. 5a and 5b show views in section along the lines Va—Va and Vb—Vb in FIG. 4, these FIGS. 5a and 5b being disposed in such a way as to reflect the disposition and the alignment of the teeth, of the cut-outs and of the notches with respect to one another in the longitudinal direction L.

The first cut-out 26a of the mobile runner 7 into which the catch 19 fits comprises a front edge 30 inclined upwards and rearwards in the direction of the base 31, and a rear edge 32 which extends vertically upwards in the direction of the base 31 of the first cut-out 26a. Conversely, the second cut-out 27a of the mobile runner 7 intended to interact with the second tooth 25a offset forwards, comprises a front edge 33 which extends vertically in the direction of a base 34 and a rear edge 35 inclined upwards and forwards to a base 34 of this second cut-out 27a of the mobile runner 7. The first and second cut-outs 26a, 27a are therefore equally disposed asymmetrically relative to the longitudinal direction L.

The other cut-outs 26b, 27b of the first and second series of cut-outs 26, 27 for their part have parallel front and rear edges which extend vertically to their respective bases.

The first notch 28a of the fixed runner 6 comprises for its part a front edge 36 and a rear edge 37 which are inclined upwards and which converge in the direction of the base of the first notch 28a. Likewise, the second notch 29a comprises a front edge 38 and a rear edge 39 which are inclined upwards and which converge in the direction of the base of the second notch 29a. In this first embodiment, the notches 28b, 29b disposed on each side of the notches 28a, 29a are identical to the said notches 28a and 29a. The first and second rows of notches 28, 29 are therefore disposed symmetrically relative to the longitudinal direction L.

Thus, when a user actuates the cross-bar 16, the control finger 17 of each lever 15a (FIG. 2) presses on the control rod 20 so as to move the catch 19 in a substantially vertical movement to the unlocked position in which the first and second series of teeth 24, 25 do not interact with the first and second rows of notches 28, 29 of the fixed runner 6. In this unlocked position of the catch 19, the mobile runner 7 can thus be moved longitudinally relative to the fixed runner 6.

When the user releases the cross-bar 16, the spring 22 interposed between the metal guide 21 and the collar 23 of the control rod 20 then automatically returns the catch 19 to its locked position.

When the catch 19 is returned thus by means of the spring 22, and if the first and second cut-outs 26a, 27a are not substantially aligned with the first and second notches 28a, 29a, as shown in FIGS. 5a, 5b, one of the teeth 24a or 25a then comes into contact with the inclined edge 37 or 38 of the first notch 28a or 29a. More precisely, when the notches and the cut-outs are not substantially aligned, as shown in FIGS. 5a, 5b, either the rear edge of the first tooth 24a comes into contact with the rear inclined edge 37 of the first notch 28a, or the front edge of the second tooth 25a comes into contact with the inclined front edge 38 of the second notch 29a.

In this configuration, as soon as the mobile runner 7 is slightly offset in the longitudinal direction, for example by the user, the tooth 24a or 25a in contact with the notch associated with it may then continue to move upwards until it also comes into contact with the inclined edge of the cut-out that is associated with it.

Thus, the first tooth 24a is required to move upwards until its front edge is in contact with the inclined front edge 30 of the first cut-out 26a and its rear edge is in contact with the inclined rear edge 37 of the first notch 28a. Likewise, the second tooth 25a continues to move upwards under the effect of the spring 22 until its front edge comes into contact with the inclined front edge 38 of the second notch 29a, and its rear edge comes into contact with the inclined rear edge 35 of the second cut-out 27a. Thus, when in the configuration as shown in FIGS. 5a, 5b, the catch 19 is in its locked position in which no more longitudinal clearance exists between the fixed runner 6 and the mobile runner 7.

In this locked position of the catch 19, each of the first and second teeth 24a, 25a has a width greater than the width of the coverage region of the bases of the notch and of the cut-out associated with them. In this first embodiment, the first and second teeth 24a, 25a intended to interact with the first and second cut-outs 26a, 27a are formed by the central teeth of the catch 19 disposed near the lower end of the control rod 20. However, provision may be made for the first and second asymmetrical teeth to be end teeth, that is to say teeth disposed at one of the longitudinal ends of the catch 19. Likewise, provision may be made for the first tooth 24a to be a central tooth and for the second tooth 25a and the second cut-out 27a to be respectively an end tooth of the catch 19 and an end cut-out. Furthermore, according to another variant embodiment, provision may be made for all the cut-outs 26b and 27b to be identical to the first and second cut-outs 26a and 27a and for the first and second series of teeth 24, 25 to be disposed asymmetrically.

Figure 6A:
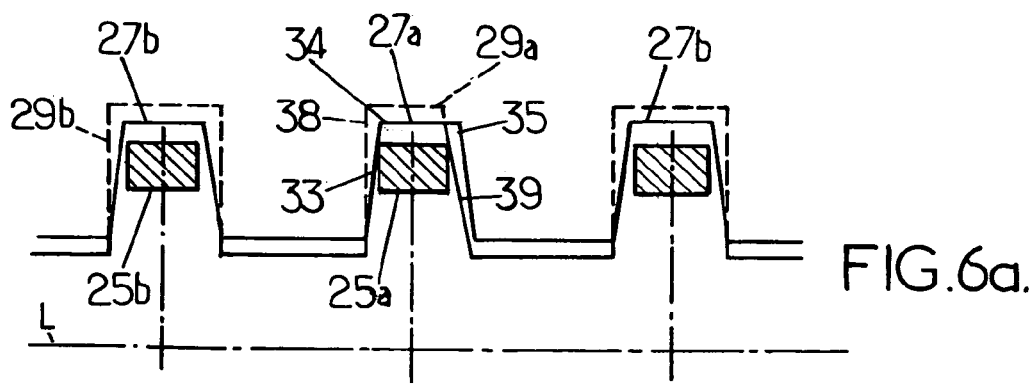
FIGS. 6a and 6b are views of a variant of the first form of embodiment of the first and second runners of the slide along the same sectional lines as for FIGS. 5a and 5b.
Figure 6B:
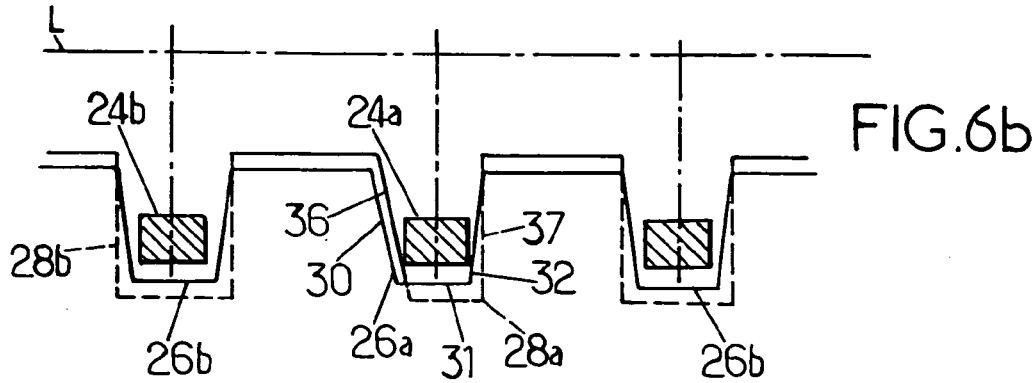

According to a variant of this first embodiment shown in FIGS. 6a, 6b, provision may be made for the configuration of the first and second notches to be transposed with those of the first and second cut-outs. As can be seen in these figures, in this instance, the first and second teeth 24a and 25a still remain disposed asymmetrically relative to the longitudinal direction L, whereas, on this occasion, the first and second cut-outs 26a and 27a are disposed symmetrically relative to the longitudinal direction L. In this variant embodiment, the first and second notches 28a and 29a are for their part disposed asymmetrically relative to the longitudinal direction, such that when the catch 19 is in the locked position, the first tooth 24a has a front edge in contact with the inclined front edge 36 of the first notch 28a and a rear edge in contact with the rear edge 32 of the first cut-out 26a. Likewise, the second tooth 25a has a front edge in contact with the inclined front edge 33 of the second cut-out 27a and a rear edge in contact with the inclined rear edge 39 of the second notch 29a.

Figure 7A:
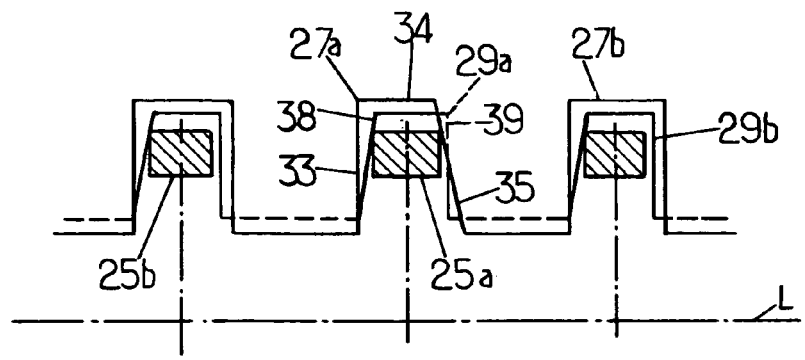
FIGS. 7a and 7b are views along the same sectional lines as for FIGS. 5a and 5b showing a second form of embodiment of the first and second runners and also of the catch of the slide.
Figure 7B:
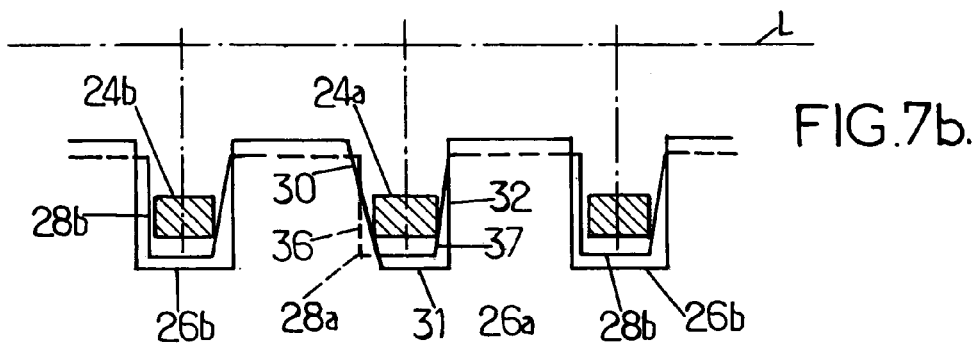

According to a second embodiment shown in FIGS. 7a, 7b, in this instance all the teeth 24a and 24b of the first series of teeth 24, and all the teeth 25a and 25b of the second series of teeth 25 are disposed symmetrically relative to the longitudinal direction. Furthermore, the first and second cut-outs 26a and 27a are disposed asymmetrically in the longitudinal direction such that the first cut-out 26a has a front edge 30 that is inclined and that the second cut-out 27a has a rear edge 35 that is inclined. Furthermore, the first notch 28a presents a front edge 36 which extends vertically and a rear edge 37 that is inclined and which extends upwards and forwards in the direction of the base of the first notch 28a. The notches 28b disposed on each side of the first notch 28a have a configuration identical to that of the first notch 28a. Likewise, the second notch 29a presents a rear edge 39 that is straight and which extends vertically and a front edge 38 that is inclined upwards and rearwards in the direction of the base of the second notch 29a. The notches 29b disposed on each side of the second notch 29a have a configuration identical to that of the second notch 29a. The first and second rows of notches 28, 29 are therefore also disposed asymmetrically relative to the longitudinal direction L. However, provision may be made for the respective rear edges of the notches 29 to be also inclined and for the respective front edges of the notches 28 to be inclined such that the notches 28, 29 are disposed symmetrically relative to the longitudinal direction L. Thus, when the catch 19 is returned to its locked, up, position under the effect of the spring 22, the first tooth 24a is in contact with the inclined front edge 30 of the first cut-out 26a and with the inclined rear edge 37 of the first notch 28a and, on the other hand, the second tooth 25a is in contact with the front edge 38 of the second notch 29a and with the rear edge 35 of the second cut-out 27a, so that the longitudinal clearance between the fixed runner 6 and the mobile runner 7 is removed.

Figure 8:
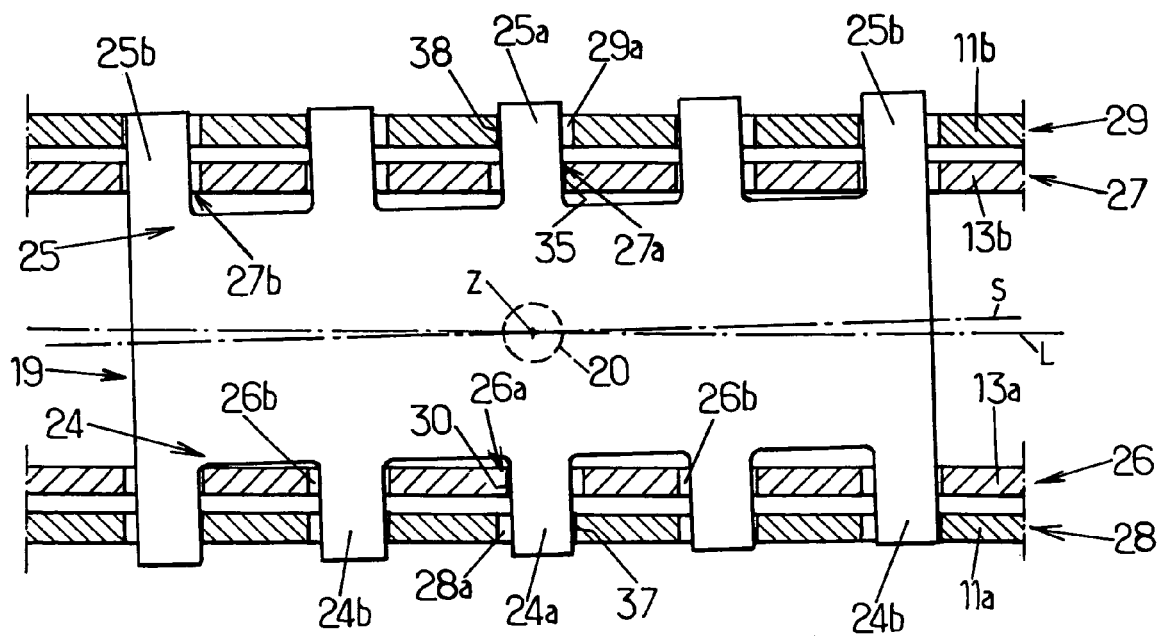
FIG. 8 is a schematic view in partial section of the first and second runners and also of the catch according to a third form of embodiment of the slide.
Figure 9A:
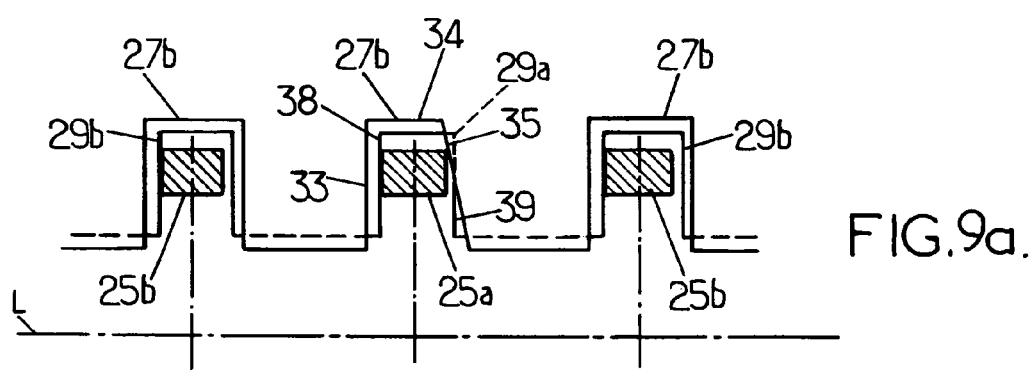
FIGS. 9a and 9b are views along the same sectional lines as for FIGS. 5a and 5b showing a fourth form of embodiment of the first and second runners and also of the catch of the slide.
Figure 9B:
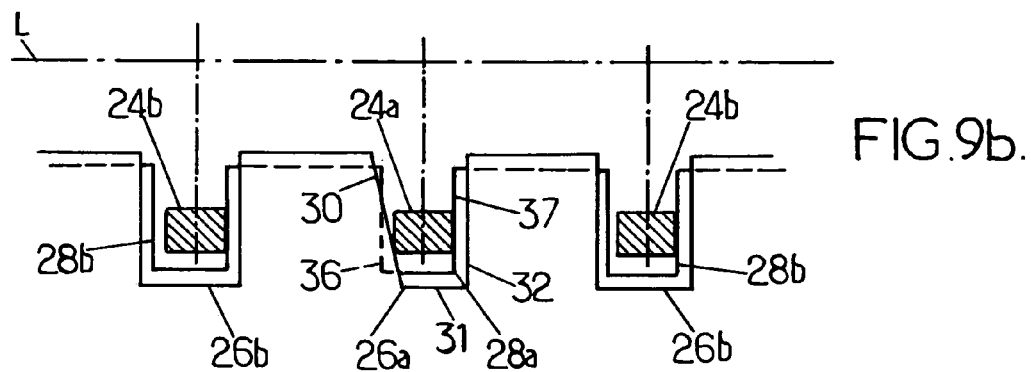

According to a third embodiment shown in FIGS. 8, 9a and 9b, the first and second series of teeth 24, 25 are disposed symmetrically relative to the longitudinal direction L when the catch 19 experiences no pivoting about the vertical axis Z and the teeth are aligned in this longitudinal direction L, that is when the catch 19 is in the unlocked position. This symmetry of the first and second series of teeth 24, 25 of the catch may be shown by the axis of symmetry S specific to the catch 19 and shown in FIG. 8. In this embodiment, the first and second cut-outs 26a and 27a are disposed asymmetrically relative to the longitudinal direction L, the first and second rows of notches 28, 29 being disposed symmetrically relative to this longitudinal direction L. The first and second cut-outs 26a, 27a have a configuration similar to that shown in FIGS. 5a and 5b, that is the first cut-out 26a has a front edge 30 inclined upwards and rearwards whereas the second cut-out 27a has a rear edge 35 inclined upwards and forwards in the direction of the base of this second cut-out 27a.

Thus, when the user releases the cross-bar 16, the spring 22 returns the catch 19 to the locked, up, position, thereby bringing the front edge of the first tooth 24a into contact with the inclined edge 30 of the first cut-out 26a whereas the rear edge of the second tooth 25a is brought into contact with the inclined rear edge 35 of the second cut-out 27a as shown in FIG. 8. As the first and second teeth 24a, 25a are substantially perpendicular to the vertical axis of pivoting Z of the catch 19, as the catch rises to its up position, the front edge 30 and rear edge 35 of the first and second cut-outs 26a, 27a tend to cause the whole catch 19 to pivot about the vertical axis Z and in the anti-clockwise direction, so that the axis of symmetry S specific to the catch 19 also pivots about the vertical axis Z in the anti-clockwise direction, thereby causing the first and second series of teeth 24, 25 to be asymmetrical relative to the longitudinal direction L. This pivoting movement of the catch 19 then causes the rear edge of the first tooth 24a to come into contact against the rear edge 37 of the first notch 28a and the front edge of the second tooth 25a to come into contact against the front edge 38 of the second notch 29a, this being under the effect of the spring 22 which tends to raise the bolt to its highest position. This configuration also makes it possible to remove any longitudinal clearance of the mobile runner 7 relative to the fixed runner 6 to the extent that the crossed points of contact of the first and second teeth 24a, 25a relative to the notches and the cut-outs prevent any pivoting movement of the catch 19 about the vertical axis Z when the catch reaches its locked position, as shown in FIGS. 8, 9a and 9b.

In this embodiment shown in FIGS. 8, 9a and 9b, the first and second rows of notches 28, 29 each have notches of substantially rectangular shape with front and rear edges that are vertical and substantially parallel with one another. However, provision may be made for the first and second rows of notches 28, 29 to have a configuration similar to that shown in FIGS. 5a and 5b, that is substantially triangular in shape with front and rear edges that are inclined and converge upwards to their respective bases.

What is claimed is:

1. Slide for vehicle seat, comprising first and second runners and locking means to prevent or allow a relative longitudinal movement of the first and second runners, and in which:
    the first runner comprises at least first and second notches, each notch being delimited in a longitudinal direction by a front edge and a rear edge,
    the second runner comprises at least first and second cut-outs, each cut-out being delimited in a longitudinal direction by a front edge and a rear edge,
    the locking means comprise a catch mounted on the second runner and having at least first and second teeth, the catch being able to be moved in a direction perpendicular to the longitudinal direction between a locked position in which the first and second teeth pass through the first and second cut-outs respectively to engage in the first and second notches to immobilize the first and second runners relative to one another, and an unlocked position in which the first and second teeth do not interact with the first and second notches of the first runner to allow the relative movement of the first and second runners,
    wherein the front edge of at least one of the first cut-out and notch is inclined rearwards and the rear edge of at least one of the second cut-out and notch is inclined forwards and wherein the catch is suitable for allowing, when it is in the locked position, firstly the first tooth to be solely in contact with the front edge of the first cut-out and with the rear edge of the first notch and secondly, the second tooth to be solely in contact with the rear edge of the second cut-out and with the front edge of the second notch.

2. Slide according to claim 1, wherein the front edge of the first cut-out is inclined rearwards and the rear edge of the second cut-out is inclined forwards, the said first and second cut-outs being disposed asymmetrically relative to the longitudinal direction.

3. Slide according to claim 2, wherein the first and second teeth are disposed asymmetrically relative to the longitudinal direction.

4. Slide according to claim 2, wherein the first and second teeth are disposed symmetrically relative to the longitudinal direction, and the first and second notches are disposed asymmetrically relative to the longitudinal direction.

5. Slide according to claim 1, wherein each notch and each cut-out has a base from which the front and rear edges extend, and each tooth has a width which, in the longitudinal direction, is less than the width of the coverage region of the bases of each notch and of the corresponding cut-out when the catch is in the locked position.

6. Slide according to claim 1, wherein:
    the catch comprises a first series of teeth comprising in particular the first tooth and a second series of teeth comprising in particular the second tooth,
    the second runner comprises a first series of cut-outs comprising in particular the first cut-out intended to interact with the first tooth and a second series of cut-outs comprising in particular the second cut-out intended to interact with the second tooth, and
    the first runner comprises a first row of notches comprising in particular the first notch and a second row of notches comprising in particular the second notch.

7. Slide according to claim 6, wherein only the first and second cut-outs of the first and second series of cut-outs are disposed asymmetrically relative to the longitudinal direction.

8. Slide according to claim 6, wherein all the cut-outs of the first and second series of cut-outs are disposed asymmetrically relative to the longitudinal direction.

9. Slide according to claim 1, wherein the front edge of the first notch is inclined rearwards and the rear edge of the second notch is inclined forwards, the said first and second notches being disposed asymmetrically relative to the longitudinal direction, and wherein the first and second teeth are also disposed asymmetrically relative to the longitudinal direction.

10. Slide according to claim 1, wherein the second runner comprises guidance means for guiding the catch in the direction perpendicular to the longitudinal direction, and elastic return means for elastically returning the catch from the unlocked position to the locked position.

11. Slide according to claim 10, wherein the catch is attached at a bottom end of a control rod mounted so as to slide and pivot in the said guidance means of the second runner.

* * * * *